United States Patent

Massa

[15] 3,643,544
[45] Feb. 22, 1972

[54] HIGH-STRENGTH STRUCTURAL BLIND FASTENER FOR USE IN AIRPLANES, ROCKETS AND THE LIKE

[72] Inventor: Joseph H. Massa, Rocky River, Ohio

[73] Assignee: The National Screw & Manufacturing Company, Cleveland, Ohio

[22] Filed: Feb. 27, 1969

[21] Appl. No.: 803,040

[52] U.S. Cl. .......................................85/72, 85/74, 151/21
[51] Int. Cl. .........................F16b 13/06, F16b 39/30
[58] Field of Search ........................85/72, 74, 73, 61, 77–78; 151/21 C, 21 B; 29/522

[56] References Cited

UNITED STATES PATENTS

| 3,202,036 | 8/1965 | Simko | 85/77 |
| 1,626,863 | 5/1927 | Nacey | 151/21 C X |
| 2,765,699 | 10/1956 | La Torre | 85/72 |
| 2,974,558 | 3/1961 | Hodell | 85/72 |
| 3,129,630 | 4/1964 | Wing et al. | 85/72 |
| 3,262,353 | 7/1966 | Waeltz et al. | 85/72 |
| 3,311,147 | 3/1967 | Walker | 151/21 B |

FOREIGN PATENTS OR APPLICATIONS

| 601,865 | 7/1960 | Canada | 85/74 |

Primary Examiner—Ramon S. Britts
Attorney—Watts, Hoffmann, Fisher & Heinke

[57] ABSTRACT

A three-part high-strength structural-type blind fastener of the bolt- and nut-type, the parts of which are made of high-strength material and have a structural design relationship which provides in the fastener higher tensile and shear characteristics and improved clamp up characteristics.

3 Claims, 4 Drawing Figures

PATENTED FEB 22 1972 3,643,544

INVENTOR.
JOSEPH H. MASSA
BY Watts, Hoffmann,
Fisher & Heinke
ATTORNEYS.

HIGH-STRENGTH STRUCTURAL BLIND FASTENER FOR USE IN AIRPLANES, ROCKETS AND THE LIKE

SUMMARY OF INVENTION

The invention provides a novel and improved structural type three part blind fastener of the nut and bolt type for use in airplanes, rockets and like devices, and which fastener will not only have higher tensile and shear strengths for any given size and weight, but can be driven to a greater preload and will have improved so-called clampup characteristics over presently known blind fasteners of the type to which the invention relates. The fastener also has improved locking between the bolt and nut parts so as to better withstand vibrations including those of supersonic frequencies without failure.

The invention further provides a novel and improved blind fastener or series of fasteners of the character referred to so constructed and proportioned that a fastener of given size will better secure together members, the overall thickness of which may vary within wider limits.

DESCRIPTION OF INVENTION

The invention resides in the use of specific materials and constructions having specific design relationship and further advantages will be hereinafter referred to or will be apparent from the following description of the preferred embodiment described with reference to the accompanying drawings forming a part of this specification in which similar reference characters designate corresponding parts, and in which.

Figure 1:
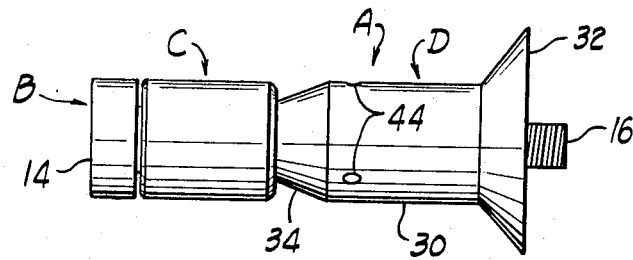
FIG. 1 is an elevational view of a fastener embodying the present invention.

The reference character A designates an assembled blind fastener constructed in accordance with the present invention. The fastener comprises three parts, a screw or bolt B, a cylindrical tubular sleeve C on the shank of the screw adjacent to the head thereof and a nut D threaded onto the shank of the screw B at the end opposite the head. The fastener is assembled as a part of its manufacture and is sold in the assembled condition shown in FIG. 1 of the drawings.

The screw B forms the blind member or part of the fastener and comprises the threaded shank 12 having a head 14 formed integral with one end and a driving connection 16 at its other end. The driving connection 16 is, in the embodiment shown, a continuation or extension of the shank 12 of the screw provided with opposite flat sides 18 and 20 adapted to be engaged by a driving tool and connected to the shank proper by a weakened shank portion formed by a V-shaped groove 22 at the end of the flat sides 18 and 20 nearest the head of the screw. The external or overall diameter of the head 14 of the screw B is preferably about one and one half times the effective shank diameter. The bearing side of the head 14 of the screw may be undercut slightly, if desired, as indicated at 24.

The sleeve C is a continuous cylindrical, tubular member and forms the blind head part of the fastener. Opposite ends of the sleeve may be beveled slightly both externally and internally, as indicated at 26 and 28. The internal diameter of the sleeve C is such that it can be assembled on the shank 12 of the screw by hand but will not be loose thereon. The nut D forms the external or nonblind part of the fastener and comprises the cylindrical body portion 30 having a flush head 32 formed integral with one end and a tapered or frustoconical bearing surface 34 on the other end, that is, the end adjacent to the collar C when the parts of the fastener are assembled.

Figure 4:
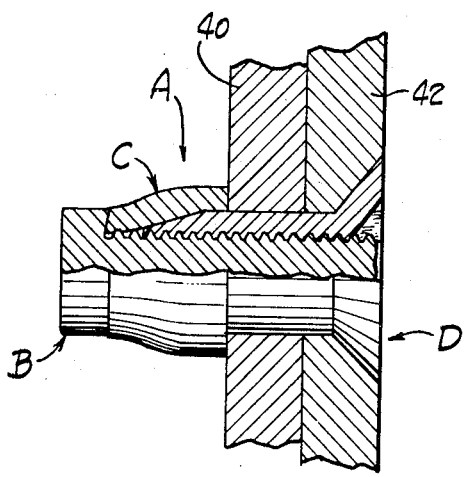
FIG. 4 is a view similar to FIG. 3 but showing the fastener in operation fixedly securing the members together.
Figure 3:
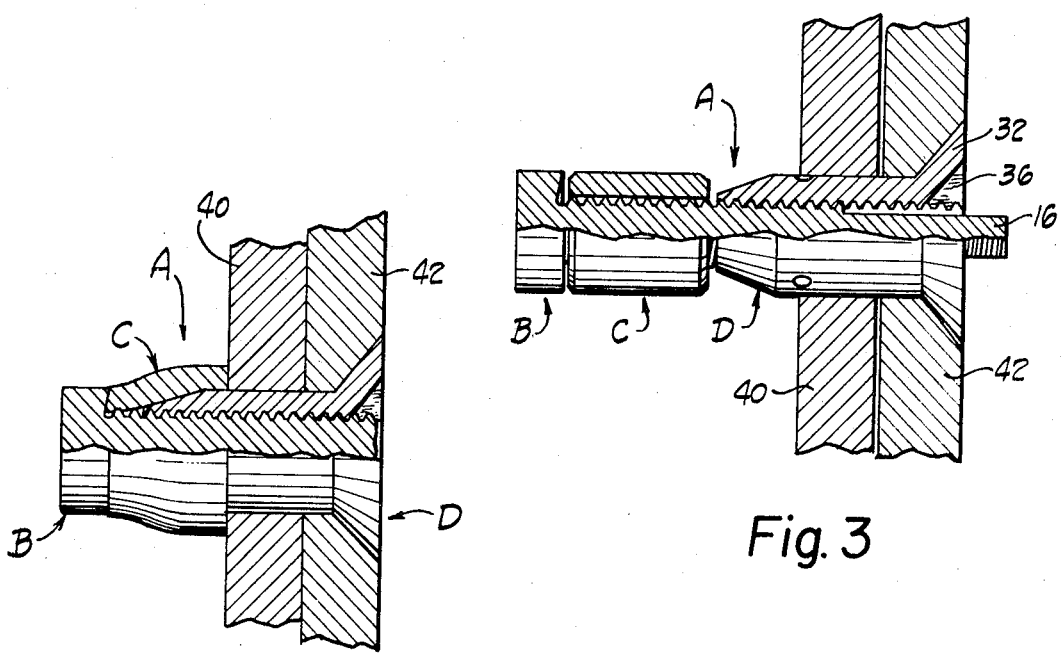
FIG. 3 is an axial, sectional view, with portions in elevation, showing the fastener in position in two members to be secured together thereby.

The head 32 of the nut D is provided with a plurality of driving slots 36, four in the embodiment shown, equally spaced about the threaded aperture through the nut. The driving slots are relatively shallow so as to provide maximum material at the junction of the head 32 with the body 30 of the nut. To further strengthen the nut at this location the conical exterior surface of the head 32 joins the cylindrical body 30 with a radius 38, from about 0.03 to 0.08 inch, rather than a sharp angle. In use the fastener is inserted through aligned holes in the members to be secured thereby, for example, the members 40, 42, shown in FIGS. 3 and 4, with the head 14 of the screw B leading until the head 32 of the nut D abuts the countersink in the accessible side of the member 42. The overall or outside diameters of the head 14 of the screw B, the sleeve C and the body portion 30 of the nut D are essentially equal to one another and the aligned holes in the members to be secured thereby are so formed, as by drilling, that the fastener can be inserted therethrough but will not be loose therein. In some instances it may be desirable to make the external or outside diameter of the sleeve C slightly less, for example, about 0.002 inch, than that of the head 14 of the bolt B so as to avoid any possibility of marring or scratching the sleeve during assembly.

After the fastener A is assembled with the members to be secured together thereby, the fastener is driven or set by rotating the screw B relative to the nut D to draw and expand the nut end of the sleeve C over the adjacent tapered or conical end 34 of the nut D to form an internal or blind head. Preferably the screw B is rotated to contract the fastener and expand the blind head sleeve C over the conical end 34 of the nut D and move it into tight clamping engagement with the adjacent side of the member 40 while the head 32 of the nut D is drawn into tight clamping engagement with the adjacent side of the member 42.

The screw B is rotated until the flattened end portion 16 breaks away from the shank 12 at the notched section or groove 22. This assures tightening or driving of the fastener to a predetermined stress or load. Due to its particular design the present fastener can be driven to as high as 50% of its design tensile load. The slots 36 may be omitted, if desired, and the fastener driven with a driver not requiring driving connections on the nut part.

When the fastener A is driven to a predetermined tension, the members 40, 42 are securely fixed together or clamped between the head 32 of the nut D which forms the external or nonblind head and engages the side of the member 42 adjacent thereto, and the expanded end of the sleeve C which forms the internal or blind head and engages the side of the member 40 adjacent thereto. The head 32 of the nut D, as shown, is of the flush type, and the hole in the member 42 is countersunk to accommodate the head, the construction being such that in use the head 32 of the nut D is flush with the exterior of the member 42. This feature, however, is not essential to the invention, but is preferred in many applications, such as where the fastener is employed on the exterior of aircraft, as it provides a smooth surface. Obviously, other types of either flush or protruding heads may be employed.

If the shank side or bearing face 24 of the head 14 of the screw is undercut the radially outer two-thirds of the undercut bearing surface is preferably made frustoconical in shape having an angle of about 20° with a plane normal to the longitudinal axis of the screw part B. Other angles, however, may be employed. The radially inner part of the bearing surface 24 preferably merges into the adjacent portion of the shank of the screw with a smooth radius tangent to the shank. As the head 14 of the screw B is drawn against the end of the sleeve C adjacent thereto and the nut end of the sleeve C forced over the tapered bearing surface 34 of the nut D the undercut bearing surface 24 tends to, and, does contract the end of the sleeve C engaged thereagainst. This action is facilitated if the outer circumference of the adjacent end of the sleeve C is beveled, as indicated at 26, as it then better conforms with the frustoconical surface of the head 14 of the screw B. The external end of the opening through the sleeve is also preferably chamfered or beveled, as at 28, to facilitate entrance therein of the end of the conical bearing surface 34 of the nut D. Preferably, both ends of the sleeve C are beveled thereby making the sleeve reversible and thus facilitating assembly.

As the parts of the fastener A are drawn together the nut end of the sleeve C is expanded over the tapered bearing surface 34 of the nut D and as it expands or flares out, becomes thinner and assumes a frustoconical shape. The wall thickness of the opposite end of the sleeve, irrespective of whether the bearing surface 24 of the screw B is or is not undercut, increases because of the compression or force exerted thereagainst by the head of the screw. The pressure of the sleeve C upon the end of the tapered portion 34 of the nut D tends to and does spring and bend the end of the tapered portion of the nut D into tight clamping engagement with the shank 12 of the screw B to produce a thread interference lock between the nut D to the screw B to resist unthreading and loosening of the bolt A during use. The flexibility of the tapered end 34 of the nut D, if desired, may be increased by countersinking or counterboring the same for a short distance, to a slight taper, for example, approximately 25°, but this is not essential to the present invention.

The parts of the fastener are made as short as possible consistent with other requirements in an effort to save weight, and are preferably so proportioned that when the fastener is in use or driven, the tapered end of the nut D is spaced from the head 14 of the screw B so as not to force the end of the sleeve C adjacent to the head outwardly thereof.

In practice, the fasteners A are made in predetermined sizes and the various parts are designed and proportioned, etc., to produce maximum strength and minimum weight for a given size. The shanks of the screws or bolts are preferably made to standard screw sizes, for example, 4–48, , 6–40, 10–32, 12–28, ¼–28, etc., and a given shank construction predetermines, to at least a large extent, the construction of the other parts, etc. The threads are preferably of the truncated type having a flat root and a flat crown produced by conventional methods. The screw thread is formed by thread rolling, and extends along the shank to a point immediately adjacent to the head of the screw. The root diameter of the thread is increased with respect to that of a standard screw thread of the same size or maximum thread diameter, see Screw Thread Standards for Federal Services, Handbook H28 (1957) Part I, United, American, American National and National Miniature Threads, published by the U.S. Department of Commerce, National Bureau of Standards, by grinding off the crests of the threads of the dies to form a thread having a root diameter greater than the standard root diameter for the same maximum thread diameter but not sufficiently great to cause objectionable interference therebetween and the internal mating threads in the nut D, which are preferably formed with a standard tap. The root diameter is preferably made equal to about 83 to 84 percent of the maximum thread diameter.

The screw B is made of metal having a uniform composition and a high tensile strength preferably in excess of 240,000 p.s.i. but not less than 140,000 p.s.i. and a ductility of approximately 15 to 40 percent as measured by reduction of area, that is, the difference between the original cross-sectional area of a sample and the area of its smallest cross section measured after fracture due to tension, expressed in percentage of the original cross-sectional area. The preferred material is a low carbon, nickel-cobalt-molybdenum maraging steel heat treated to give the required physical properties.

The screw is formed and threaded by conventional methods while the material is relatively soft and subsequently heat treated to obtain the desired physical properties.

The blind head part of sleeve C is preferably made of metal having a uniform composition, a tensile strength between 50,000 and 145,000 p.s.i., a ductility as measured by reduction of area as explained above of from about 40 to 76 percent, and the ability to work harden at least twice that of low-carbon basic steel as measured by increase in hardness, that is, the difference between the original hardness of a test sample and the hardness thereof after working. The preferred material is a corrosion and heat-resistant steel Type A–286.

The nut D may be made of material similar to that used for either the screw B or the collar or sleeve C. It is preferably made of alloy steel 8740 grade.

The degree or angle of taper of the conical bearing surface or portion 34 of the nut D is also reasonably critical as the longitudinal and radial forces produced thereby against the sleeve C must be proportioned such that the sleeve will not split but will be adequately cold worked during driving of the fastener. The dimensions of the parts and the materials of which they are made are such that in driving the material at the expanded end of the sleeve part is stressed beyond its yield point but not up to its ultimate strength. The sleeve must not be expanded into too flat a shape to withstand the thrust imposed thereon in use. The angle of the bevel end portion 34 may be from about 15° to 22°, preferably from about 16½° to 18°.

With the fasteners of the present invention the members or plates 40 and 42 are embraced or held together between blind and nonblind heads, at least one of which is ductile or relatively ductile. The ductile head absorbs and is not harmed by vibrations to which the fasteners are subjected to in use. Because of this the fastener, in addition to having high shear and tensile characteristics, will not fail when subjected to vibrations.

To further resist unthreading of the screw B after the fastener is driven the fastener A shown is provided with a plurality of thread interference portions formed by one or more, in the present instance three, circumferentially spaced, relatively small depressions 44 in its exterior produced after the parts of the fasteners are assembled to the position or the approximate position shown in FIG. 1, by pressing a semispherical nosed punch into the exterior of the body portion 30 of the nut D immediately adjacent to but spaced slightly from the frustoconical bearing surface. The punch is forced into the nut D a sufficient distance and with sufficient force to deform the portion of the internal thread of the nut located underneath the punch-formed exterior depression. This location of the indentations best avoids the possibility that they will be positioned at the shear plane between two members secured by the fastener. The diameter of the semispherical nose of the punch is preferably about $d$ and $d/4$ where $d$ is the external diameter of the body portion 30 of the nut D at the frustoconical bearing surface 34; the best actual size within this range depending primarily upon the pitch of the internal thread of the nut, since the indentation must distort internal thread flanks sufficiently to create frictional resistance against helical flank surface portions of the mating threads of the screw B. All indentations are located in a common circle about the body portion. This, coupled with the use of several spaced indentations, e.g., three or four, assures that one or more will be most effectively located relative to the thread flanks to provide optimum interference.

In the formation of the depressions 44, portions of the thread of the nut therebeneath are forced against and into the thread of the screw to produce thread interference therewith, but the thread of the screw is not materially deformed, if at all. Having the parts assembled at the time the depressions 44 are formed affords the necessary control of the thread interference to produce a predetermined uniform interference and lock in the fasteners. This is a very important advantage where the driving torque is controlled by the effective diameter of the screw underneath the breakoff groove 22 and it is a requirement that the fasteners be driven to a predetermined percentage of their design tensile load, for example, 50 percent. Under requirements such as those mentioned, the amount of driving torque required in overcoming the thread interference must be uniform and must be taken into consideration in determining the depth of the groove 22, otherwise the fasteners will not drive uniformly and will not have the same clamp up qualities, that is, clamp together the members secured thereby with the same force.

Further advantage in forming the thread interference subsequent to assembling the parts together is that the interference is not destroyed by subsequent relative rotation between the screw and the nut as very little such rotation occurs in the driving of the fastener. If the thread interference was produced before the parts were assembled, most, if not all, of the interference in the nut would be worn away by the assembly of the nut on the screw thread. This is particularly true because of the sharp edges at the termination of the thread portions formed by the flat sides of the driving connection 16.

Fasteners embodying the present invention are made not only to different diameters, but also to different designs lengths $t$, which vary one to the next in a series by small increments $i$. The design lengths typically correspond nominally to reference thicknesses of plates or members to be secured together for convenience in selection of fasteners of suitable length for use. The increments $i$ by which the design lengths of the series vary, are small, e.g., 0.0625 inch. It is particularly important for optimum performance that the frustoconical surface portion 34 be located entirely beyond, i.e., outside the members being gripped. At the same time, plates or members secured together vary from a reference thickness, yet must be properly secured by a fastener of the series with assurance that the surface portion 34 will lie beyond the members.

Figure 2:
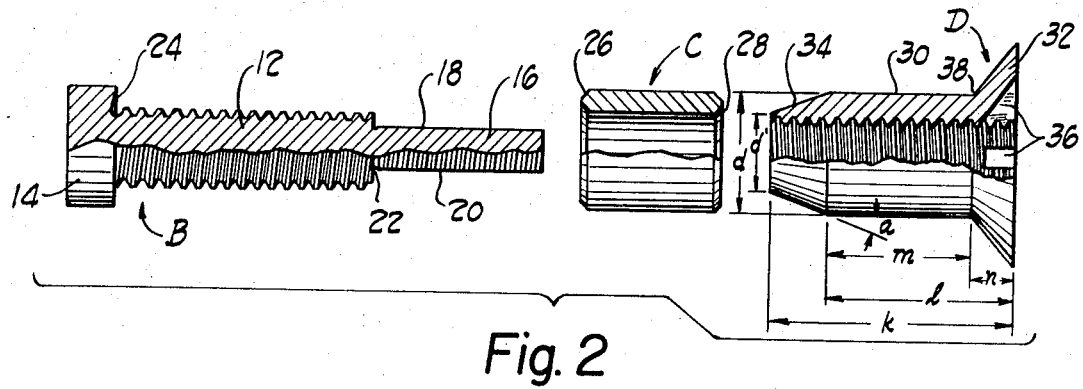
FIG. 2 is an expanded view of the fastener shown in FIG. 1, with parts broken away and in axial section to show the construction.

According to the provision of the present invention, the large end of the frustoconical bearing surface 34 of the nut D, of a fastener designed for a specific reference thickness will never fall within the members secured together by the fastener, notwithstanding any variations in nut diameter, length, or angle of the frustoconical portion, within specified manufacturing tolerances. It will be understood that such variations will cause the axial location of the large end of the frustoconical bearing surface 34 to vary along the length of the nut. At the same time, according to the provisions of the present invention, the large end of the surface 34 will not extend any unnecessary distance beyond the members being joined. To meet these requirements, a minimum body length $l$ is provided for the nut D that is equal to the design length $t$ plus one-half of the incremental variation $i$. That is, $^l\text{min}=t+(i/2)$. From FIG. 2 it can be seen that the body length $l$ is equal to the length $m$ of the body portion 30 plus the thickness or depth $n$ of the conical part of the head. In the case of a nut with a protruding-type head, $l = m$, since the head is not located within the grip or thickness of the members being secured together. Maximum $l$ is established in accordance with this invention at $$t+\frac{i}{2}+\left(\frac{\max d - \min d'}{2}\cdot \cotangent a_{\min}\right)$$
$$-\left(\frac{\min d - \max d'}{2}\cdot \cotangent a_{\max}\right)+v,$$

where $d$ is the diameter of the body portion 30 of the nut D at the frustoconical bearing surface 34, $d'$ is the smaller diameter of the frustoconical bearing surface 34, $a$ is the angle in an axial plane of the conical bearing surface with respect to the longitudinal central axis of the nut, and $v$ is the tolerance variation in the length $k$ of the nut, which length $k$ consists of the body length $l$ ($m$ or $m+n$ as the case may be) plus the axial length of the frustoconical portion 34 of the nut D.

In actual practice, the variation between minimum $l$ and maximum $l$, where the angle $a$ varies between 15° to 22°, the diameters $d$ and $d'$ each have a tolerance range of up to 0.002 inch (e.g., ± 0.001), and the tolerance variation $v$ in the overall length $k$ of 0.010 inch (e.g., ±0.005), can be expressed by the empirical relationship $d/(6\pm1)$. Thus $^l\text{min}=t+\frac{1}{2}$ and $^l\text{max}=t+\frac{1}{2}+d/(6\pm1)$.

Comparative tests between high strength fasteners manufactured in accordance with the present invention and blind fasteners commercially available show the present fastener to be far superior to the commercially available fasteners. As an example of the superior properties of the present fastener, tests show that the tensile strength and clamp up characteristics greatly exceed those of commercially available fasteners, that is, the members secured together thereby are and can be drawn much tighter together by the fastener of the present invention than with presently available fasteners and will sustain greater loads without failure.

From the foregoing description of the preferred embodiment of the invention, it will be apparent that the objects heretofore enumerated and others have been accomplished and that there has been provided a novel and improved so-called blind fastener or bolt which, for a given size, has maximum performance characteristics and particularly high so-called tensile strength and clamp up ability. While the preferred embodiment of the invention has been described in considerable detail, the invention is not limited to the precise constructions shown and/or described and it is the intention to cover hereby all adaptations, modifications and uses thereof which come within the practice of those skilled in the art to which the invention relates and within the scope of the appended claims.

Having thus described my invention, what I claim is:

1. An assembled three-part high-strength structural blind fastener of a series having design-holding lengths $t$ that vary by a predetermined design increment $i$ for attaching together structural members of airplanes, rockets and the like and of different total thickness having aligned openings therein and one side inaccessible or blind, said assembled blind fastener comprising: a relatively nonductile substantially homogeneous discrete metal screw part having a tensile strength of not less than about 140,000 p.s.i. and a ductility of approximately 15 to 40 percent measured by reduction of area comprising a cylindrical shank provided with a thread, a head formed integral with the blind end of said shank, said shank have driving means on the end thereof opposite to said head and a section of less strength than the strength of the minimum effective cross-sectional area of said shank at the head end of said means; a continuous cylindrical relatively ductile metal sleeve blind head part on said shank of said screw part adjacent to said head thereof and having a tensile strength between 50,000 and 145,000 p.s.i. and a ductility of about 40 to 76 percent measured by reduction of area and an outside diameter substantially equal to the diameter of said head of said screw part; and a metal nut part having an internal thread and a tensile strength of not less than about 140,000 p.s.i. and a ductility of approximately 15 to 40 percent measured by reduction of area threaded onto said shank of said screw part, said nut part having a tubularlike body portion and a head formed integral therewith at the nonblind end thereof for engaging the accessible or nonblind side of members secured together by the fastener and an axially extending frustoconical surface at its other end inclined outwardly with respect to its longitudinal axis and towards its nonblind end at an angle from about 15° to 22° for expanding the end of said sleeve blind head part adjacent thereto beyond the yield strength of the material thereof but under the ultimate strength thereof to form a blind head engaging the inaccessible side of members secured together by the fastener upon said end of said sleeve part being forced over said frustoconical surface of said nut part upon rotation of said screw part relative to said nut part in driving said fastener, said tubularlike body portion of said nut part having a plurality of external discrete impressions adjacent to said frustoconical surface and spaced from one another, said impressions being formed subsequent to assembly of said screw and nut parts whereby said internal and external threads of said nut and screw parts have discrete distorted portions only radially inwardly of said impressions to form thread interference locks between said screw part and said nut part; said tubularlike body portion of said nut part of said fastener plus any portion of said head of said nut part adapted to be received within the members which the fastener is to secure together having a design minimum grip length $l$ equal to a design length $t$ plus one-half of the design incremental length $i$ and a design maximum grip length $l$ equal to $t + (i/2 + (d/6 \pm 1)$, where $d$ is the diameter of said body part of said nut part at said frustoconical surface and has a dimensional tolerance range of 0.002 inch and the length of said nut, i.e., the length of the body portion plus any portion of the head adapted to fit within the members which the fastener is to secure together, plus the axial length of the frustoconical surface has a dimensional tolerance range of 0.010 inch; whereby members secured together by said fastener having a total thickness within the design grip range of the fastener are embraced between heads engaging opposite sides thereof one of which heads is relatively hard but more ductile than the screw part and the frustoconical surface of said nut is located wholly beyond the blind side of the members.

2. A series of assembled three-part high-strength structural blind fasteners having design holding lengths $t$ that vary by a predetermined design increment i for attaching together structural members of airplanes, rockets and the like and of different total thickness having aligned openings therein and one side inaccessible or blind, each of the assembled blind fasteners of the series comprising: a relatively nonductile substantially homogeneous discrete metal screw part having a tensile strength of not less than about 140,000 p.s.i. and a ductility of approximately 14 to 40 percent measured by reduction of area comprising a cylindrical shank provided with a thread, a head formed integral with the blind end of said shank said shank having driving means on the end thereof opposite to said head and a section of less strength that the strength of the minimum effective cross-sectional area of said shank at the head end of said means; a continuous cylindrical relatively ductile metal sleeve blind head part on said shank of said screw part adjacent to said head thereof and having a tensile strength between 50,000 and 145,000 p.s.i. and a ductility of about 40 to 76 percent measured by reduction of area and an outside diameter substantially equal to the diameter of said head of said screw part; and a metal nut part having an internal thread and a tensile strength of not less than about 140,000 p.s.i. and a ductility of approximately 15 to 40 percent measured by reduction of area threaded onto said shank of said screw part, said nut part having a tubularlike body portion and a head formed integral therewith at the nonblind end thereof for engaging the accessible or nonblind side of members secured together by the fastener and an axially extending frustoconical surface on its other end inclined outwardly with respect to its longitudinal axes and towards its nonblind end at an angle from about 15° to 22° for expanding the end of said sleeve blind head part adjacent thereto beyond the yield strength of the material thereof but under the ultimate strength thereof to form a blind head engaging the inaccessible side of members secured together by the fastener upon said end of said sleeve part being forced over said frustoconical surface of said nut part upon rotation of said screw part relative to said nut part in driving said fastener, said tubularlike body portion of said nut part having a plurality of external discrete impressions adjacent to said frustoconical surface and spaced from one another, said impressions being formed subsequent to assembly of said screw and nut parts whereby said internal and external threads of said nut and screw parts have discrete distorted portions only radially inwardly of said impressions to form thread interference locks between said screw part and said nut part; said tubularlike body portion of said nut part of each of said fastener plus any portion of said head of said nut part adapted to be received within the members which the fastener is to secure together having a design minimum grip length 1 equal to a design length t plus one-half of the design incremental length $i$ and a design maximum grip length 1 equal to $t + \frac{i}{2} +$ $$\left[ \frac{\max d - \min d'}{2} \cdot \cotangent a_{min} \right] -$$

$$\left[ \frac{\min d - \max d'}{2} \cdot \cotangent a_{max} \right] + v, \text{ where } d \text{ is the diameter}$$

of said body part of said nut part at said frustoconical surface, $d'$ is the smaller diameter of the frustoconical surface and $a$ is the angle in the axial plane of said frustoconical surface with respect to the longitudinal central axis of the nut part and $v$ is the tolerance variation of the length of the body portion plus any portion of the head adapted to fit within the members which the fastener is to secure together plus the axial length of the frustoconical surface; whereby members secured together by said fasteners having a total thickness with the design grip range of the fastener are embraced between heads engaging opposite sides thereof one of which heads is relatively hard but more ductile than the screw part and the frustoconical surface of said nut is located wholly beyond the blind side of the members.

3. An assembled three part high strength structural blind fastener for connecting together structural members of airplanes, rockets and the like, said assembled blind fastener comprising: a relatively nonductile substantially homogeneous discrete metal screw part having a tensile strength of not less than about 140,000 p.s.i. and a ductility of approximately 15 to 40 percent measured by reduction of area comprising a cylindrical shank provided with a thread, a head formed integral with the blind end of said shank, said shank having driving means on the end thereof opposite to said head and a section of less strength than the strength of the minimum effective cross-sectional area of said shank at the head end of said means; a continuous cylindrical relatively ductile metal sleeve blind head part on said shank of said screw part adjacent to said head thereof and having a tensile strength between 50,000 and 145,000 p.s.i. and a ductility of about 40 to 76 percent measured by reduction of area and an outside diameter substantially equal to the diameter of said head of said screw part; and a metal nut part having an internal thread and a tensile strength of not less than about 140,000 p.s.i. and a ductility of approximately 15 to 40 percent measured by reduction of area threaded onto said shank of said screw part, said nut part having a tubularlike body portion and a head formed integral therewith at the nonblind end thereof for engaging the accessible or nonblind side of members secured together by the fastener and an axially extending frustoconical surface on its other end inclined outwardly with respect to its longitudinal axis and towards its nonblind end at an angle from about 15° to 22° for expanding the end of said sleeve blind head part adjacent thereto beyond the yield strength of the material thereof but under the ultimate strength thereof to form a blind head engaging the inaccessible side of members secured together by the fastener upon said end of said sleeve part being forced over said frustoconical surface of said nut part upon rotation of said screw part relative to said nut part in driving said fastener, said tubularlike body portion of said nut part having a plurality of external discrete impressions adjacent to said frustoconical surface and spaced from one another, said impressions being formed subsequent to assembly of said screw and nut parts whereby said internal and external threads of said nut and screw parts have discrete distorted portions only radially inwardly of said impressions to form thread interference locks between said screw part and said nut part.

* * * * *